United States Patent [19]

Saotome et al.

[11] Patent Number: 5,289,204
[45] Date of Patent: Feb. 22, 1994

[54] IMAGE RECORDING APPARATUS

[75] Inventors: Shigeru Saotome; Masahide Sasai, both of Kanagawa, Japan

[73] Assignee: Fuji Photo Film Co., Ltd., Kanagawa, Japan

[21] Appl. No.: 46,835

[22] Filed: Apr. 14, 1993

[30] Foreign Application Priority Data

Apr. 16, 1992 [JP] Japan ................... 4-96569

[51] Int. Cl.$^5$ ..................... H04N 1/21; B41J 2/435
[52] U.S. Cl. ............................. 346/108
[58] Field of Search ............... 346/1.1, 108, 107 R, 346/76 L, 160

[56] References Cited

U.S. PATENT DOCUMENTS

| 4,258,264 | 3/1981 | Kotera et al. |
| 4,276,473 | 6/1981 | Kato et al. |
| 4,315,318 | 2/1982 | Kato et al. |
| 4,387,428 | 6/1983 | Ishida et al. |
| 4,760,458 | 7/1988 | Watanabe et al. ............ 358/486 |
| 5,212,568 | 5/1993 | Graves et al. ............... 358/474 |

FOREIGN PATENT DOCUMENTS

| 56-11395 | 2/1981 | Japan. |
| 61-5193 | 2/1986 | Japan. |
| 2-191941 | 7/1990 | Japan. |

OTHER PUBLICATIONS

English language abstract for Japanese Patent Publication No. 61-5193.
English language abstract for Japanese Unexamined Patent Publication No. 2-191941.

Primary Examiner—Mark J. Reinhart
Attorney, Agent, or Firm—Sughrue, Mion, Zinn, Macpeak & Seas

[57] ABSTRACT

In an image recording apparatus, light having been modulated in accordance with an image signal is irradiated to a photographic material from one surface side of the photographic material, and an image is thereby recorded on the photographic material. The photographic material is composed of a plurality of layers including an approximately transparent substrate and an emulsion layer overlaid on at least one surface of the substrate. Degrees of gloss of the front surface and the back surface of the photographic material are different from each other. A selection device selects a surface of the photographic material, from the side of which surface the image recorded on the photographic material is to be seen. An inversion device inverts the image signal in accordance with an output of the selection device such that an erect image may be seen from the side of the surface of the photographic material, which surface has been selected by the selection device.

6 Claims, 2 Drawing Sheets

IMAGE RECORDING APPARATUS

BACKGROUND OF THE INVENTION

1. Field of the Invention

This invention relates to an image recording apparatus, wherein a photographic material is exposed to light, which has been modulated in accordance with an image signal, and an image represented by the image signal is thereby recorded on the photographic material.

2. Description of the Prior Art

Image recording apparatuses, wherein a photographic material is exposed to light, which has been modulated in accordance with an image signal, and an image represented by the image signal is thereby recorded (reproduced) on the photographic material, have heretofore been used in various fields.

For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal, and the electric signal (image signal) is processed and then used in an image recording apparatus for reproducing the X-ray image as a visible image on photographic film. In this manner, a visible image having good image quality with high contrast, high sharpness, high graininess, or the like, can be reproduced.

Also, when certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays, such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used in an image recording apparatus for reproducing the radiation image of the object as a visible image on photographic film.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order for the desired image density to be obtained, an appropriate read-out gain is set when the emitted light is being detected and converted into an electric signal to be used in the reproduction of a visible image on a recording material, such as a photographic material, or on a display device, such as a CRT display device.

As described above, with image recording apparatuses utilized in various types of image recording and reproducing systems, images are recorded (reproduced) on photographic materials in accordance with image signals representing the images. The degree of surface gloss of the photographic material varies in accordance with the size of emulsion particles contained in the emulsion layer, the presence or absence of a protective layer, and the presence or absence of a matting agent in the protective layer. For example, if the emulsion particles contained in the emulsion layer are fine particles, the surface of the photographic material will be glossy. If the emulsion particles contained in the emulsion layer are coarse particles, the surface of the photographic material will be matte (non-glossy). Also, if a matting agent is contained in the protective layer, the surface of the photographic material will be non-glossy. If no matting agent is contained in the protective layer, the surface of the photographic material will be glossy. As a photographic material containing a matting agent, a novel silver halide photographic material has been proposed in Japanese Unexamined Patent Publication No. 2(1990)-191941. The proposed silver halide photographic material comprises a substrate and a non photosensitive layer, which is overlaid at least on one side of the substrate and which contains 5 to 70 mg/m$^2$ of coarse particles having particle diameters falling within the range of 2 to 10 $\mu$m and 70 to 190 mg/m$^2$ of water-insoluble fine particles having particle diameters falling within the range of 0.3 to 1.3 $\mu$m.

Whether the surface of the photographic material is or is not to be glossy depends on choice of a person who uses the photographic material. For example, some users will prefer a photographic material having a matte surface for the reason that, if the surface of the photographic material is glossy, an image recorded on the photographic material will be difficult to see due to light reflection from the surface. Other users will prefer a photographic material having a glossy surface for its high quality impression. In order for such requirements of users of photographic materials to be satisfied, it is necessary to prepare two kinds of photographic materials having identical photographic properties but having different degrees of gloss of surfaces, from the sides of which the recorded images are seen. Preparation of two such kinds of photographic materials has been a heavy burden to the manufacturers who supply photographic materials and to users who uses the photographic materials.

SUMMARY OF THE INVENTION

The primary object of the present invention is to provide an image recording apparatus wherein, two kinds of photographic materials having identical photographic properties but having different degrees of gloss of surfaces, from the sides of which the recorded images are seen, need not be prepared, and wherein an image is recorded on a photographic material such that a surface of the photographic material, from the side of which surface the recorded image is seen, may coincide with a surface having a degree of gloss which the user of the photographic material requires.

The present invention provides an image recording apparatus, wherein light having been modulated in accordance with an image signal is irradiated to a photographic material from one surface side of the photographic material, and an image is thereby recorded on the photographic material, the photographic material being composed of a plurality of layers including an approximately transparent substrate and an emulsion layer overlaid on at least one surface of the substrate, degrees of gloss of the front surface and the back surface of the photographic material being different from each other, the image recording apparatus comprising:

i) a selection means for selecting a surface of the photographic material, from the side of which surface the image recorded on the photographic material is to be seen, and ii) an inversion means for inverting the image signal in accordance with an output of the selection means such that an erect image may be seen from the side of the surface of the photographic material, which surface has been selected by the selection means.

The term "approximately transparent substrate" as used herein means a completely colorless transparent substrate and a colored transparent substrate. Also, the term "erect image" as used herein means an image, the vertical and horizontal arrangement of which is identical with that of an object the image of which was recorded. Further, the term "inverting an image signal" as used herein means inverting the image signal such that a mirror image may be obtained on a surface for the recording of the image.

With the image recording apparatus in accordance with the present invention, light having been modulated in accordance with the image signal is irradiated to the photographic material from one surface side of the photographic material, and the image is thereby recorded on the photographic material. The photographic material is composed of a plurality of layers including the approximately transparent substrate and the emulsion layer overlaid on at least one surface of the substrate. Degrees of gloss of the front surface and the back surface of the photographic material are different from each other. The image recording apparatus comprises the selection means for selecting the surface of the photographic material, from the side of which surface the image recorded on the photographic material is to be seen, and the inversion means for inverting the image signal in accordance with the output of the selection means such that an erect image may be seen from the side of the surface of the photographic material, which surface has been selected by the selection means. A surface having a desired degree of gloss is selected by the selection means. In cases where the selected surface is the front surface of the photographic material, the image signal is directly used during the recording of the image. In cases where the selected surface is the back surface of the photographic material, the image signal is inverted and used during the recording of the image. Therefore, it is not necessary to prepare two kinds of photographic materials having identical photographic properties but having different degrees of gloss of surfaces, from the sides of which the recorded images are seen. Instead, only a single kind of photographic material may be prepared, the front surface of the back surface of which have different degrees of gloss. The image can be recorded on the photographic material such that the erect image may be seen from the side of the surface having a desired degree of gloss.

DESCRIPTION OF THE PREFERRED EMBODIMENTS

The present invention will hereinbelow be described in further detail with reference to the accompanying drawings.

Figure 1:
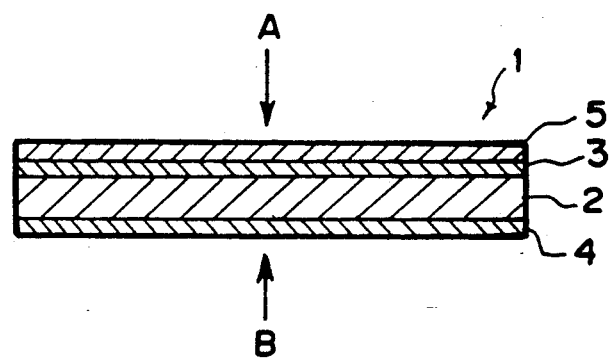
FIG. 1 is a sectional view showing a sheet of photographic film used in an embodiment of the image recording apparatus in accordance with the present invention.

FIG. 1 is a sectional view showing a sheet of photographic film used in an embodiment of the image recording apparatus in accordance with the present invention.

As illustrated in FIG. 1, a photographic film 1 used in this embodiment comprises a colorless transparent substrate 2, an emulsion layer 3 and a protective layer 5 which are overlaid on the front surface of the substrate 2, and a protective layer 4 which is overlaid on the back surface of the substrate 2. The front surface (i.e. the surface indicated by the arrow A) of the photographic film 1 is a matte surface, and the back surface thereof (i.e. the surface indicated by the arrow B) is a glossy surface. In order to render the surface of photographic film matte, one of the following processes may be employed:

1) a process wherein the sizes of the particles of silver halides, and the like, contained in the emulsion layer are set at values falling within the range of 0.50 to 0.87 $\mu$, the thickness of the emulsion layer is set at approximately 2.13 $\mu$, the thickness of the protective layer is set at approximately 1.18 $\mu$, and the rate of Ag applied is set at approximately 3 g/m$^2$, 2) a process wherein a matting agent is contained in the protective layer, 3) a process wherein the protective layer is not provided or is made thin, and 4) a process wherein the sizes of the particles contained in the emulsion layer are made large.

In order to render the surface of photographic film glossy, one of the following processes may be employed:

5) a process wherein the sizes of the particles of silver halides, and the like, contained in the emulsion layer are set at 0.3 $\mu$ or less, the thickness of the emulsion layer is set at approximately 2.13 $\mu$, the thickness of the protective layer is set at approximately 1.18 $\mu$, and the rate of Ag applied is set at approximately 3 g/m$^2$, 6) a process wherein a matting agent is not contained in the protective layer, 7) a process wherein the protective layer is made thick, and 8) a process wherein the sizes of the particles contained in the emulsion layer are made small.

The photographic film 1 used in this embodiment is provided with the protective layers. Therefore, in this embodiment, the process described in (1) above is carried out on the front surface of the photographic film 1. Also, the process described in (6) above is carried out on the back surface of the photographic film 1.

On the photographic film 1, an image is recorded in the manner described below.

Figure 2:
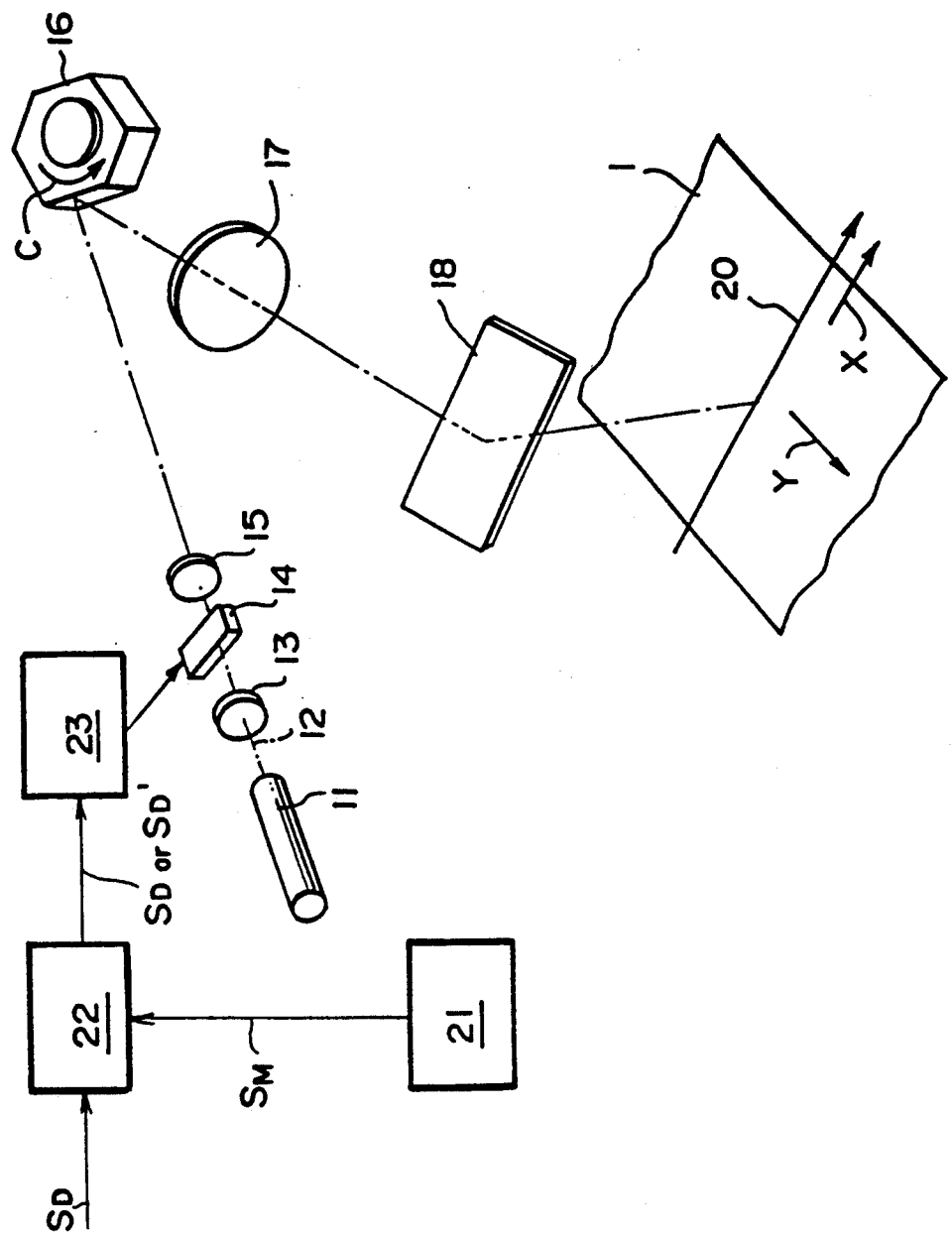
FIG. 2 is a schematic view showing the embodiment of the image recording apparatus in accordance with the present invention.

FIG. 2 is a schematic view showing the embodiment of the image recording apparatus in accordance with the present invention.

With reference to FIG. 2, a laser beam 12 is produced by a laser beam source 11. The laser beam 12 passes through a lens 13, an acousto-optic light modulator (hereinafter referred to as the "AOM") 14, and a lens 15. The laser beam 12 is then reflected and deflected by a rotating polygon mirror 16, which rotates quickly in the direction indicated by the arrow C. Thereafter, the laser beam 12 passes through an f$\theta$ lens 17 and is reflected by a reflection mirror 18. In this manner, the laser beam 12 impinges upon the photographic film 1 from the side indicated by the arrow A in FIG. 1. The laser beam 12 repeatedly scans the photographic film 1 along a scanning line 20 extending in the main scanning direction, which is indicated by the arrow X. At the same time, the photographic film 1 is conveyed by a conveyance means (not shown) in the sub-scanning direction indicated by the arrow Y. The sub-scanning direction is approximately normal to the main scanning direction indicated by the arrow X.

The AOM 14 is connected to an AOM drive circuit 23. The AOM drive circuit 23 operates the AOM 14 and modulates the intensity of the laser beam 12 in accordance with an image signal SD such that an image represented by the image signal SD may be recorded (reproduced) on the photographic film 1.

By using a selection means 21, the operator selects a surface of the photographic film 1, from the side of which surface the recorded image is to be seen. How the image is recorded when the recorded image is to be seen from the side of the matte surface of the photographic film 1 will first be described hereinbelow. When the matte surface is selected by the selection means 21, a surface signal SM, which indicates that the matte surface has been selected, is fed into an inversion means 22. From the surface signal SM, the inversion means 22 judges that the surface of the photographic film 1, from the side of which surface the recorded image is to be seen, is the matte surface. In this embodiment, the matte surface of the photographic film 1 stands facing the side that is scanned with the laser beam 12. Therefore, the inversion means 22 directly feeds the image signal SD into the AOM drive circuit 23. The AOM 14 is operated in accordance with the image signal SD, and the intensity of the laser beam 12 is modulated with the image signal SD.

In the manner described above, the photographic film 1 is exposed to the modulated laser beam 12, and the image is thereby recorded on the photographic film 1. The photographic film 1 is then subjected to a development process under predetermined conditions in a developing apparatus (not shown), and a visible image represented by the image signal SD is reproduced on the photographic film 1. The visible image is seen as an erect image from the side of the matte surface of the photographic film 1.

On the other hand, in cases where the glossy surface is selected by the selection means 21, a surface signal SM, which indicates that the glossy surface has been selected, is fed into the inversion means 22. From the surface signal SM, the inversion means 22 judges that the surface of the photographic film 1, from the side of which surface the recorded image is to be seen, is the glossy surface. In this embodiment, the glossy surface of the photographic film 1 is located on the side opposite to the side that is scanned with the laser beam 12. Therefore, the inversion means 22 inverts the image signal SD. An image signal SD', which has been obtained from the inverting process carried out in the inversion means 22, is fed into the AOM drive circuit 23. The AOM 14 is operated in accordance with the image signal SD', and the intensity of the laser beam 12 is modulated with the image signal SD'.

In the manner described above, the photographic film 1 is exposed to the laser beam 12, which has been modulated with the image signal SD', and the image is thereby recorded on the photographic film 1. The photographic film 1 is then subjected to a development process, and a visible image represented by the image signal SD' is reproduced on the photographic film 1. The visible image is seen as an erect image from the side of the glossy surface of the photographic film 1.

In the embodiment described above, the process described above in (1) is carried out on the matte surface of the photographic film 1, and the process described above in (6) is carried out on the glossy surface. Alternatively, any of other processes may be carried out on each surface of the photographic film 1.

Also, in the embodiment described above, the front surface of the photographic film 1 is a matte surface, and the back surface thereof is a glossy surface. Alternatively, the front surface of the photographic film 1 may be a glossy surface, and the back surface thereof may be a matte surface. In such cases, when the glossy surface is selected as the surface, from the side of which the recorded image is to be seen, the inversion means 22 directly feeds the image signal SD into the AOM drive circuit 23, and the image is thereby recorded on the photographic film 1. The visible image thus reproduced is seen as an erect image from the side of the glossy surface of the photographic film 1. On the other hand, when the matte surface is selected as the surface, from the side of which the recorded image is to be seen, the inversion means 22 inverts the image signal SD. The image signal SD', which has been inverted by the inversion means 22, is fed into the AOM drive circuit 23, and the image is thereby recorded on the photographic film 1. The visible image thus reproduced is seen as an erect image from the side of the matte surface of the photographic film 1.

Additionally, in the embodiment described above, a sheet of photographic film, the back surface (indicated by the arrow B in FIG. 1) of which has a predetermined, constant degree of gloss, may be employed. The back surface may then always be selected by the selection means, and a visible image may be reproduced such that an erect image can be seen from the side of the back surface. In this manner, even if the degree of gloss of the surface, which is provided with an emulsion layer, varies due to a difference in the kind of the emulsion layer or due to a difference in the kind of a laser imager, an erect recorded image can be seen from the surface having the same degree of gloss.

Further, in the embodiment described above, the substrate of the photographic film is colorless and transparent. Alternatively, the substrate may be a colored transparent substrate, such as a blue transparent substrate.

Moreover, in the aforesaid embodiment, an image is recorded by scanning the photographic film with the light beam, which has been modulated with an image signal. The image recording apparatus in accordance with the present invention is also applicable when photographic film is exposed via an image forming lens system to an image, which is displayed on a CRT display device, or when a light beam produced by a light source is modulated by a liquid crystal shutter array or matrix and is then irradiated to photographic film.

Furthermore, in the aforesaid embodiment, the emulsion layer is overlaid on one surface of the substrate. Alternatively, emulsion layers may be overlaid on the two surfaces of the substrate, a laser beam may scan the substrate from the side of its one surface, and images may thereby be recorded on the two surface sides of the substrate.

What is claimed is:

1. An image recording apparatus, wherein light having been modulated in accordance with an image signal is irradiated to a photographic material from one surface side of the photographic material, and an image is thereby recorded on the photographic material, the photographic material being composed of a plurality of layers including an approximately transparent substrate and an emulsion layer overlaid on at least one surface of the substrate, degrees of gloss of the front surface and the back surface of the photographic material being different from each other, the image recording apparatus comprising:
  i) a selection means for selecting a surface, from the side of which the image recorded on the photographic material is to be seen, and
  ii) an inversion means for inverting the image signal in accordance with an output of said selection means such that an erect image may be seen from the side of the surface of the photographic material, which surface has been selected by said selection means.

2. An apparatus as defined in claim 1 wherein the image is recorded on the photographic material by scanning the photographic material with the light having been modulated in accordance with the image signal.

3. An apparatus as defined in claim 1 wherein the light having been modulated in accordance with the image signal is laser beam.

4. An apparatus as defined in claim 1 wherein the image signal has been obtained by reading out a radiation image.

5. An apparatus as defined in claim 4 wherein said radiation image has been stored on a stimulable phosphor sheet.

6. An apparatus as defined in claim 4 wherein said radiation image has been recorded on photographic film.

* * * * *